(12) United States Patent
Kang et al.

(10) Patent No.: US 12,058,087 B2
(45) Date of Patent: Aug. 6, 2024

(54) METHOD, SYSTEM, AND COMPUTER PROGRAM FOR PROVIDING ONLINE CHATROOM SERVICE

(71) Applicant: NAVER CORPORATION, Seongnam-si (KR)

(72) Inventors: Chun Sik Kang, Seongnam-si (KR); Doyoun Kim, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 192 days.

(21) Appl. No.: 17/664,772

(22) Filed: May 24, 2022

(65) Prior Publication Data

US 2022/0286413 A1 Sep. 8, 2022

Related U.S. Application Data

(63) Continuation of application No. PCT/KR2020/016408, filed on Nov. 19, 2020.

(30) Foreign Application Priority Data

Nov. 25, 2019 (KR) ........................ 10-2019-0152165
Oct. 29, 2020 (KR) ........................ 10-2020-0142504

(51) Int. Cl.
*G06F 15/16* (2006.01)
*G06Q 20/10* (2012.01)
*G06Q 50/10* (2012.01)
*H04L 51/02* (2022.01)
*H04L 51/04* (2022.01)

(52) U.S. Cl.
CPC ........... *H04L 51/04* (2013.01); *G06Q 20/102* (2013.01); *G06Q 50/10* (2013.01); *H04L 51/02* (2013.01)

(58) Field of Classification Search
CPC ....... H04L 51/02; H04L 51/04; G06Q 20/102; G06Q 50/10
See application file for complete search history.

(56) References Cited

U.S. PATENT DOCUMENTS

| | | | |
|---|---|---|---|
| 2006/0080130 A1* | 4/2006 | Choksi | G06Q 30/016 709/206 |
| 2011/0055207 A1 | 3/2011 | Schorzman et al. | |
| 2012/0191788 A1* | 7/2012 | Mellen | G16H 40/20 709/206 |

(Continued)

FOREIGN PATENT DOCUMENTS

| | | | |
|---|---|---|---|
| JP | 2003316882 A | 11/2003 | |
| JP | 2017153078 A | 8/2017 | |

(Continued)

OTHER PUBLICATIONS

ISR issued in PCT/KR2020/016408, dated Mar. 8, 2021.

*Primary Examiner* — Imad Hussain
(74) *Attorney, Agent, or Firm* — Greer Burns & Crain Ltd.

(57) ABSTRACT

A chatroom providing method includes searching for a consultation product corresponding to a user request; processing payment for the consultation product selected from the result of the search; and providing a one-to-one conversation by activating a chatroom between a user and an expert who has registered the consultation product for which the payment has been completed. A guide information associated with the consultation product is configured and provided in the chatroom as a chatbot message.

17 Claims, 16 Drawing Sheets

(56) References Cited

U.S. PATENT DOCUMENTS

| | | | | |
|---|---|---|---|---|
| 2015/0242584 A1* | 8/2015 | Butler | ................... | G06Q 10/10 705/2 |
| 2016/0099892 A1* | 4/2016 | Palakovich | ............ | H04L 51/04 709/206 |
| 2016/0360039 A1* | 12/2016 | Sanghavi | ............ | H04M 3/5183 |
| 2022/0068504 A1* | 3/2022 | Yuz | ........................ | G16H 40/67 |

FOREIGN PATENT DOCUMENTS

| | | |
|---|---|---|
| JP | 2019067175 A | 4/2019 |
| JP | 2019110412 A | 7/2019 |
| KR | 1020010035357 A | 5/2001 |
| KR | 1020050087362 A | 8/2005 |
| KR | 1020060065921 A | 6/2006 |
| KR | 1020100009862 A | 1/2010 |
| KR | 1020150068681 A | 6/2015 |
| KR | 1020190016653 A | 2/2019 |
| WO | 2018094539 A1 | 5/2018 |

* cited by examiner

METHOD, SYSTEM, AND COMPUTER PROGRAM FOR PROVIDING ONLINE CHATROOM SERVICE

CROSS-REFERENCE TO RELATED APPLICATIONS

This is a continuation application of International Application No. PCT/KR2020/016408, filed Nov. 19, 2020, which claims the benefit of Korean Patent Application Nos. 10-2019-0152165 and 10-2020-0142504, filed Nov. 25, 2019 and Oct. 29, 2020, respectively.

BACKGROUND OF THE INVENTION

Field of Invention

One or more example embodiments of the present invention in the following description relate to technology for providing an expert consultation service through a chatroom.

Description of Related Art

Currently, a method of constructing a predetermined information pool through a direct participation of a user by allowing the user to directly post opinions or answers on various issues is common in search service providers. A direct user participation-based service called a knowledge search service is increasingly widely used based on various types of search portal sites.

The knowledge search service is attracting attention in that the service allows user experience or user knowledge acquired from various offline sources on the Internet to be shared on the Internet. The number of service users is also increasing exponentially.

The knowledge search service is performed in such a manner that a questioner makes a query on the Internet and an answerer having knowledge of the query writes an answer to the query, and operated in such a manner that query contents and answer contents are recorded in a knowledge search database and a user desiring to make the same or similar query in the future is capable of easily obtaining the corresponding knowledge through a search.

For example, technology for providing a participant bulletin that allows predetermined information to be shared between users is disclosed in Korean Patent Laid-Open Publication No. 10-2006-0065921 (published on Jun. 15, 2006).

A general knowledge search service is operated by sharing knowledge in a form of question & answer (Q&A) using an open bulletin.

BRIEF SUMMARY OF THE INVENTION

One or more example embodiments provide a method and system that may provide a real-time online consultation with an expert without restrictions on time and occasion through a private one-to-one conversation. occasion One or more example embodiments provide a method and a system that may provide a paid consultation with an expert in conjunction with a simple payment service.

One or more example embodiments provide a method and a system that may provide a consultation with an expert through a chat in which a chatbot that overall guides progress of a consultation participates.

One or more example embodiments provide a method and a system that allows a user to search for a consultation on a topic desired by the user using a filter item specialized for a consultation with an expert.

According to an aspect of at least one example embodiment, there is provided an expert consultation providing method performed by a computer apparatus, wherein the computer apparatus includes at least one processor configured to execute computer-readable instructions included in a memory, and the expert consultation providing method includes, by the at least one processor, searching for a consultation product corresponding to a user request; processing a payment for the consultation product selected from search results; and providing a one-to-one conversation by activating a chatroom between a user and an expert having registered the consultation product for which the payment is completed, and the providing of the one-to-one conversation includes configuring and providing guidance information related to the consultation product using a chatbot message.

According to an aspect, the providing of the one-to-one conversation may include providing the one-to-one conversation using a conversation method selected by the expert or the user from among a text conversation, a voice call, and a video call through the chatroom.

According to another aspect, the providing of the one-to-one conversation may include reserving the one-to-one conversation through the chatroom at a time set by the expert or the user.

According to still another aspect, the processing of the payment may include processing a regular payment for the consultation product at a cycle set by the user or a cycle preset for the consultation product according to settings of the user.

According to still another aspect, the providing of the one-to-one conversation may include providing product information purchased by the user using the chatbot message when the chatroom is activated.

According to still another aspect, the providing of the one-to-one conversation may include providing a consultation start request received from the expert using the chatbot message and providing a menu for accepting start of a consultation and a menu for refusing the start of the consultation.

According to still another aspect, the providing of the one-to-one conversation may include providing a consultation start guidance when the user accepts the start of the consultation and then providing the one-to-one conversation.

According to still another aspect, the providing of the one-to-one conversation may include providing a consultation completion status received from the expert using the chatbot message and providing a menu for requesting a transaction confirmation for a product for which the consultation is completed.

According to still another aspect, the expert consultation providing method may further include, by the at least one processor, cancellation a consultation of a corresponding product when a consultation cancellation request is received from the user or the expert for the consultation product for which the payment is completed before starting the consultation.

According to still another aspect, the expert consultation providing method may further include, by the at least one processor, cancelling a consultation of a corresponding product with acceptance of the expert when a consultation cancellation request is received from the user for the consultation product for which the payment is completed after starting the consultation.

According to an aspect of at least one example embodiment, there is provided an expert consultation providing method performed by a computer apparatus, wherein the computer apparatus includes at least one processor configured to execute computer-readable instructions included in a memory, and the expert consultation providing method includes, by the at least one processor, searching for a consultation product corresponding to a user request; processing a payment for the consultation product selected from search results; and providing a one-to-one conversation by opening a chatroom between a user and an expert having registered the consultation product for which the payment is completed, and the searching includes adjusting a search range of the consultation product using at least one search filter set by the user.

According to an aspect, the searching may include searching for the consultation product using an activity status of the expert as a filter condition.

According to another aspect, the searching may include searching for the consultation product using at least one of a consultation method of the expert, a product type, a consultation price, and a consultation progress time as a filter condition.

According to an aspect of at least one example embodiment, there is provided a computer program stored in a computer-readable recording medium to computer-implement the expert consultation providing method.

According to an aspect of at least one example embodiment, there is provided a computer apparatus including at least one processor configured to execute computer-readable instructions included in a memory, wherein the at least one processor is configured to search for a consultation product corresponding to a user request, process a payment for the consultation product selected from search results, provide a one-to-one conversation by activating a chatroom between a user and an expert having registered the consultation product for which the payment is completed, and configure and provide guidance information related to the consultation product using a chatbot message.

According to some example embodiments, it is possible to provide a real-time online consultation with an expert without restrictions on time and occasion through a private one-to-one conversation.

According to some example embodiments, it is possible to provide a paid consultation with an expert in conjunction with a simple payment service.

According to some example embodiments, it is possible to provide a consultation with an expert through a chat in which a chatbot that overall guides progress of a consultation participates.

According to some example embodiments, a user may search for a consultation on a topic desired by the user using a filter item specialized for a consultation with an expert.

DETAILED DESCRIPTION OF THE INVENTION

Hereinafter, some example embodiments will be described with reference to the accompanying drawings.

An expert consultation providing system according to the example embodiments may be implemented by at least one computer apparatus and an expert consultation providing method according to the example embodiments may be performed by at least one computer apparatus included in the expert consultation providing system. Here, a computer program according to an example embodiment may be installed and executed on the computer apparatus, and the computer apparatus may perform the expert consultation providing method according to the example embodiments under the control of the executed computer program. The aforementioned computer program may be stored in a computer-readable storage medium to computer-implement the expert consultation providing method in conjunction with the computer apparatus.

Figure 1:
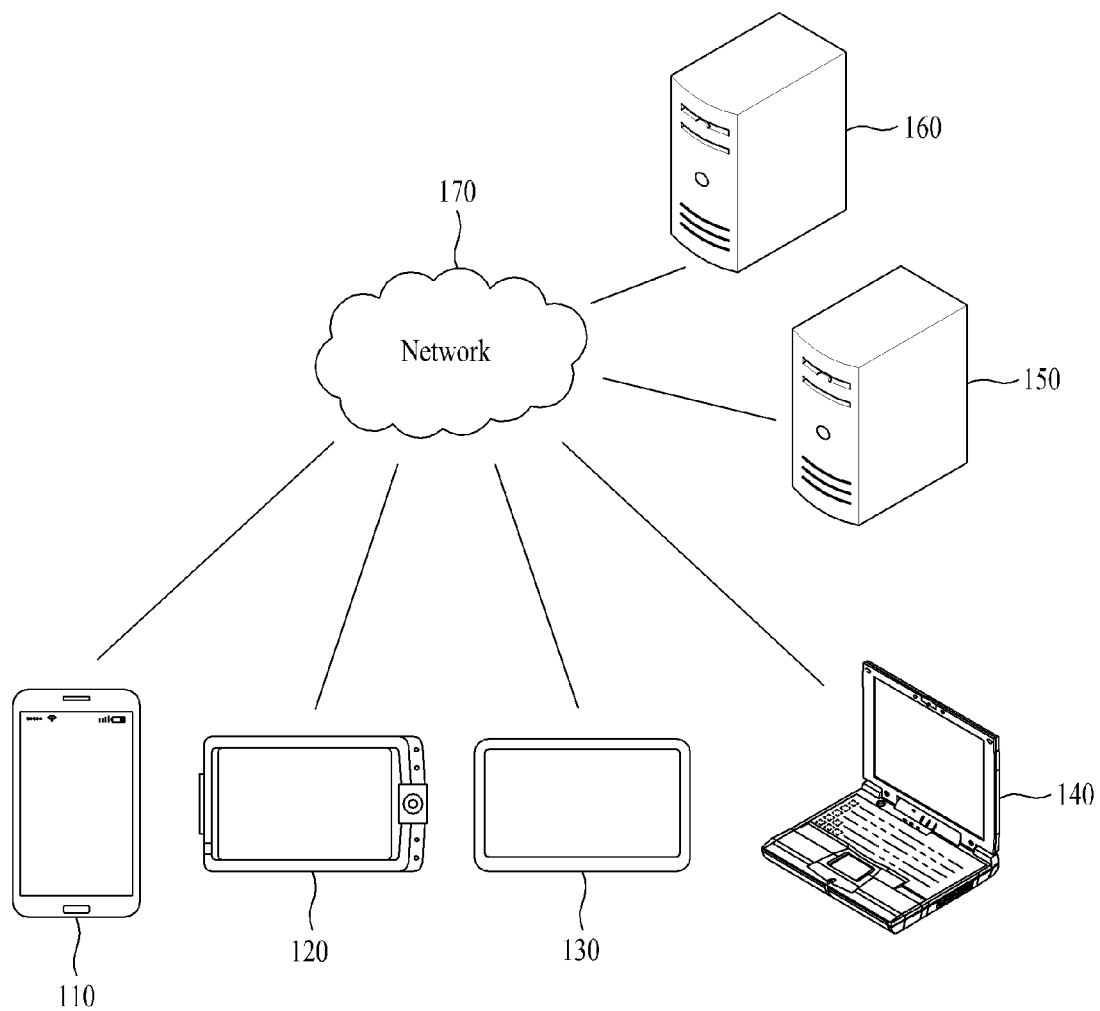
FIG. 1 is a diagram illustrating an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140 and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a service (e.g., an expert consultation service, a content providing service, a video/audio call service, a messaging service, a mail service, a social network service, a map service, a translation service, a financial service, a payment service, a search service, etc.) to the plurality of electronic devices 110, 120, 130, and 140 connected over the network 170.

Figure 2:
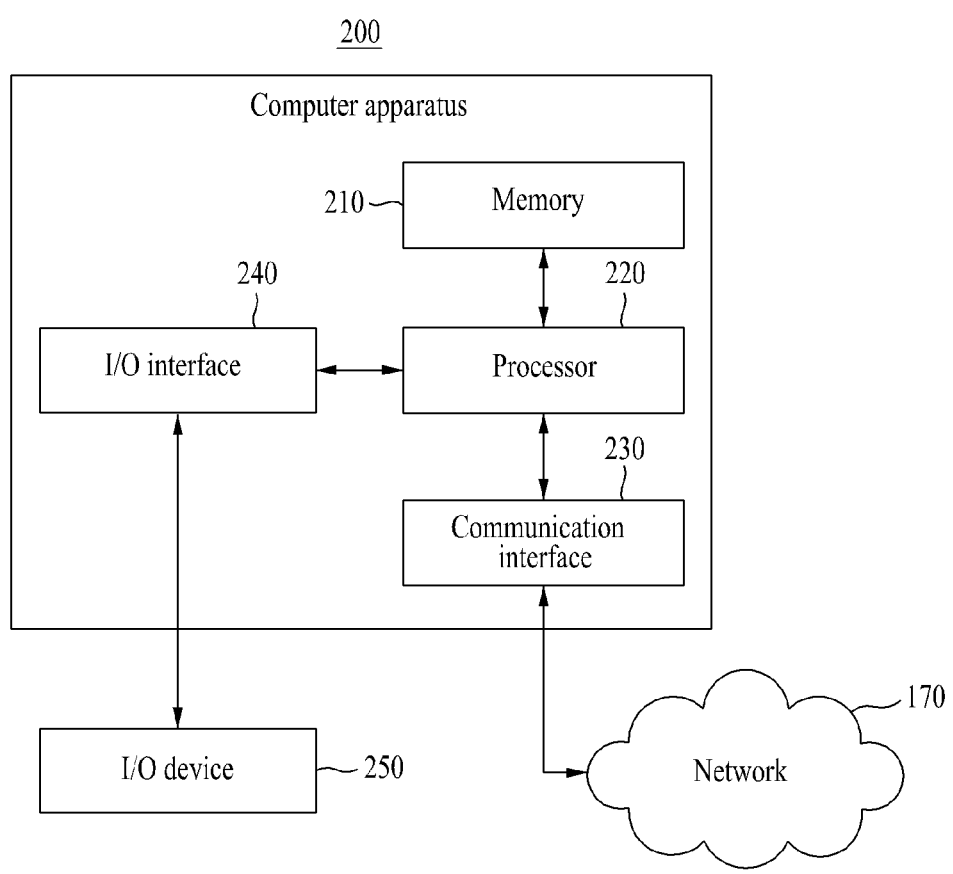
FIG. 2 is a block diagram illustrating an example of a computer apparatus according to an example embodiment.

FIG. 2 is a block diagram illustrating an example of a computer apparatus according to an example embodiment. Each of the plurality of electronic devices 110, 120, 130, and 140 of FIG. 1 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable recording medium. A permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another computer-readable recording medium separate from the memory 210. The other computer-readable recording medium may include, for example, a floppy drive, a disk, a tape, a DVD/CD-ROM drive, a memory card, etc. According to other example embodiments, software components may be loaded to the memory 210 through the communication interface 230, instead of the computer-readable recording medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus (e.g., the aforementioned storage devices) over the network 170. For example, the processor 220 of the computer apparatus 200 may deliver a request or an instruction created based on a program code stored in the storage device such as the memory 210, data, and a file, to other apparatuses over the network 170 under the control of the communication interface 230. Inversely, a signal, an instruction, data, a file, etc., from another apparatus may be received at the computer apparatus 200 through the network 170 and the communication interface 230 of the computer apparatus 200. For example, a signal, an instruction, data, etc., received through the communication interface 230 may be delivered to the processor 220 or the memory 210, and a file, etc., may be stored in a storage medium (e.g., a permanent storage device) further includable in the computer apparatus 200.

The I/O interface 240 may be a device used for interfacing with an I/O device 250. For example, an input device of the I/O device 250 may include a microphone, a keyboard, a mouse, etc., and an output device of the I/O device 250 may include a display, a speaker, etc. As another example, the I/O interface 240 may be a device for interfacing with an apparatus in which an input function and an output function are integrated into a single function, such as a touchscreen. The I/O device 250 may be configured as a single apparatus with the computer apparatus 200.

Also, according to other example embodiments, the computer apparatus 200 may include greater or less number of components than the number of components shown in FIG. 2. For example, the computer apparatus 200 may include at least a portion of the I/O device 250, or may further include other components, for example, a transceiver, a database, etc.

Hereinafter, example embodiments of a method and system for providing an expert consultation service are described.

The example embodiments may provide a new type of an expert consultation service through connection to a simple payment service and a chat service.

Figure 3:
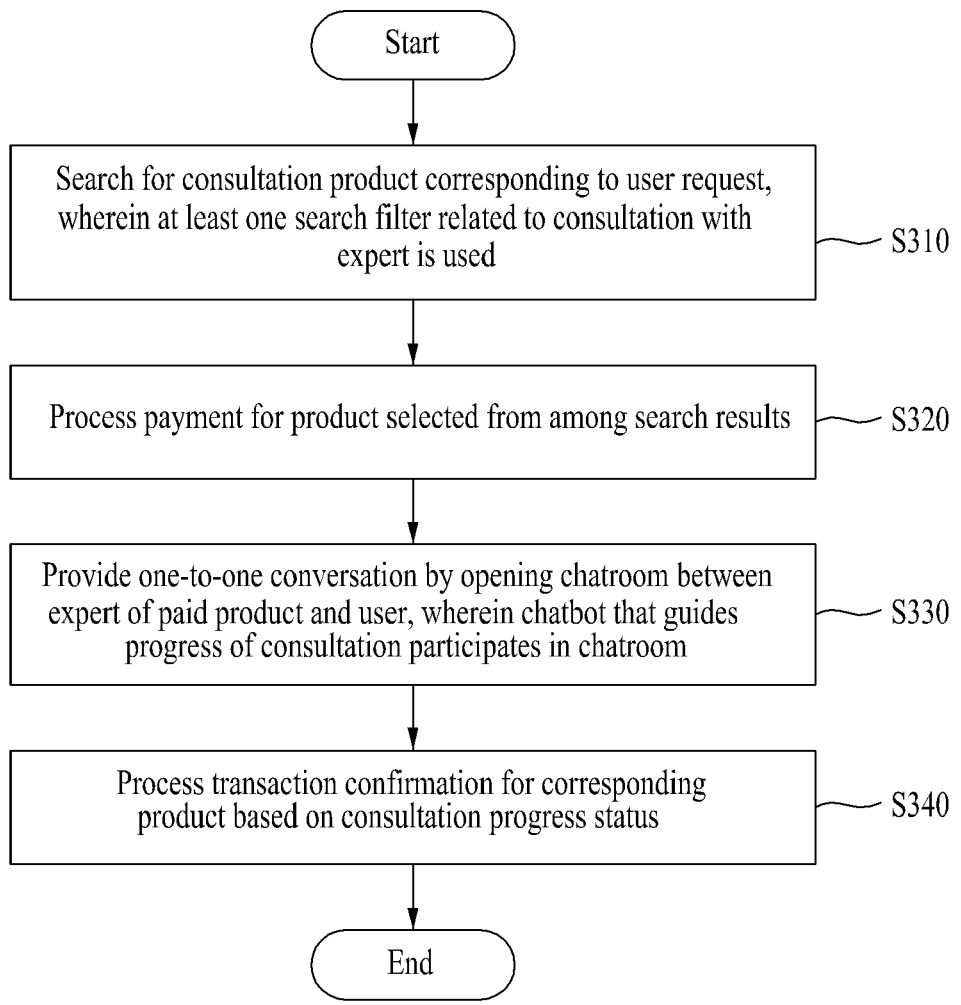
FIG. 3 is a flowchart illustrating an example of a method performed by a computer apparatus according to an example embodiment.

FIG. 3 is a flowchart illustrating an example of a method performed by a computer apparatus according to an example embodiment.

The computer apparatus 200 according to the example embodiment may provide an expert consultation providing service through connection to an exclusive application installed on a client and a website/mobile site related to the computer apparatus 200 to the client. An expert consultation providing system implemented as a computer may be configured in the computer apparatus 200. For example, the expert consultation providing system may be configured in a form of a program that independently operates or may be configured in an in-app form of a specific application.

The processor 220 of the computer apparatus 200 may include at least one component as a component to perform the expert consultation providing method of FIG. 3. Depending on example embodiments, components of the processor 220 may be selectively included in or excluded from the processor 220. Also, depending on example embodiments, components of the processor 220 may be separated or merged for performing the functions of the processor 220.

The processor 220 and the components of the processor 220 may control the computer apparatus 200 to perform operations S310 to S340 included in the expert consultation providing method of FIG. 3. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer apparatus 200.

The processor 220 may read a necessary instruction from the memory 210 to which instructions related to control of the computer apparatus 200 are loaded. In this case, the read instruction may include an instruction for controlling the processor 220 to perform the following operations S310 to S340.

The following operations S310 to S340 may be performed in an order different from the order of FIG. 3 and a portion of operations S310 to S340 may be omitted or an additional process may be further included.

Referring to FIG. 3, in operation S310, the processor 220 may search for a consultation product corresponding to a user request. The processor 220 may provide a real-time consultation with an expert through a one-to-one conversation with an expert having expertise in each field ranging from professional fields such as law, small claims lawsuit, taxation, and psychological counseling to lifestyles such as fitness, beauty, interior design, and gardening. The processor 220 may manage consultation products registered by the respective experts and may provide a search function for the registered consultation products. An expert may register a consultation product by inputting product information (e.g., a consultation field (large category/sub-category), a consultation type, a consultation condition (a consultation method (a conversation method), a consultation price, a consultation progress time), etc.). An interface for registering consultation products may be provided in a dedicated application or web/mobile site, and an expert may access the interface for registration of consultation products through an expert account and enter necessary information. For example, the processor 220 may provide a consultation product that matches a search term input from a user as search results. The processor 220 may apply a search filter to narrow a search range when searching for a consultation product and to retrieve an item the user is interested in among search items. Here, the processor 220 may provide an activity status, a conversation method (a consultation method), a product type, a consultation price, a consultation progress time, etc., as a filter item specified for the consultation with an expert. Without being limited to the above-mentioned filter items, a filter item may be expanded and thereby applied based on an option required for a production registration.

In operation S320, the processor 220 may process a payment for a specific product selected by the user from search results for the consultation product. The processor 220 may provide a platform that performs a paid consultation with an expert and may proceed with a payment of the product selected by the user in conjunction with a simple payment service. The user may purchase only a single product per expert at a time. The processor 220 may automatically process a payment for the specific product according to settings set by the user. For example, the processor 220 may automatically proceed with a payment for a corresponding product on a regular payment cycle or period determined by the user or on a regular payment cycle or period preset for the product.

In operation S330, the processor 220 may provide a one-to-one conversation by opening a chatroom between the user and an expert of the paid consultation product. The processor 220 may provide a paid consultation through the one-to-one conversation between the user and the expert. When the user purchases the consultation product, the processor 220 may open and activate a chatroom that connects the expert of the corresponding product and the user. The processor 220 may allow a chatbot serving to guide the progress of a consultation throughout the consultation to participate in a one-to-one chatroom between the expert and the user. When the chatroom is activated after the payment for the product is made, the chatbot serves to provide overall information required for a service process in addition to the one-to-one conversation between the user and the expert, such as, for example, product information purchased by the user in the chatroom, guidance on start/end of a consultation, and a role of a personal information protection manager of the expert.

In operation S340, the processor 220 may process a transaction confirmation for the corresponding product based on a consultation progress status. When a consultation progress time set by the expert elapses or when the consultation is completed upon a request from the user after the consultation starts through the chatroom between the expert and the user, the processor 220 may immediately process it as a transaction confirmation of the user for the corresponding consultation product. Before the consultation starts, the processor 220 may cancel a consultation product transaction according to a cancellation request from the expert or the user. After the consultation starts, the processor 220 may cancel the consultation product transaction with approval of the expert for the cancellation request from the user.

When a predetermined time (e.g., 24 hours) elapses after end of the consultation (transaction confirmation or transaction cancellation) is confirmed, the processor 220 may switch the chatroom between the expert and the user from an active state to an inactivate state and may delete the chatroom in the inactive state upon a request from the expert or the user.

Figure 4:
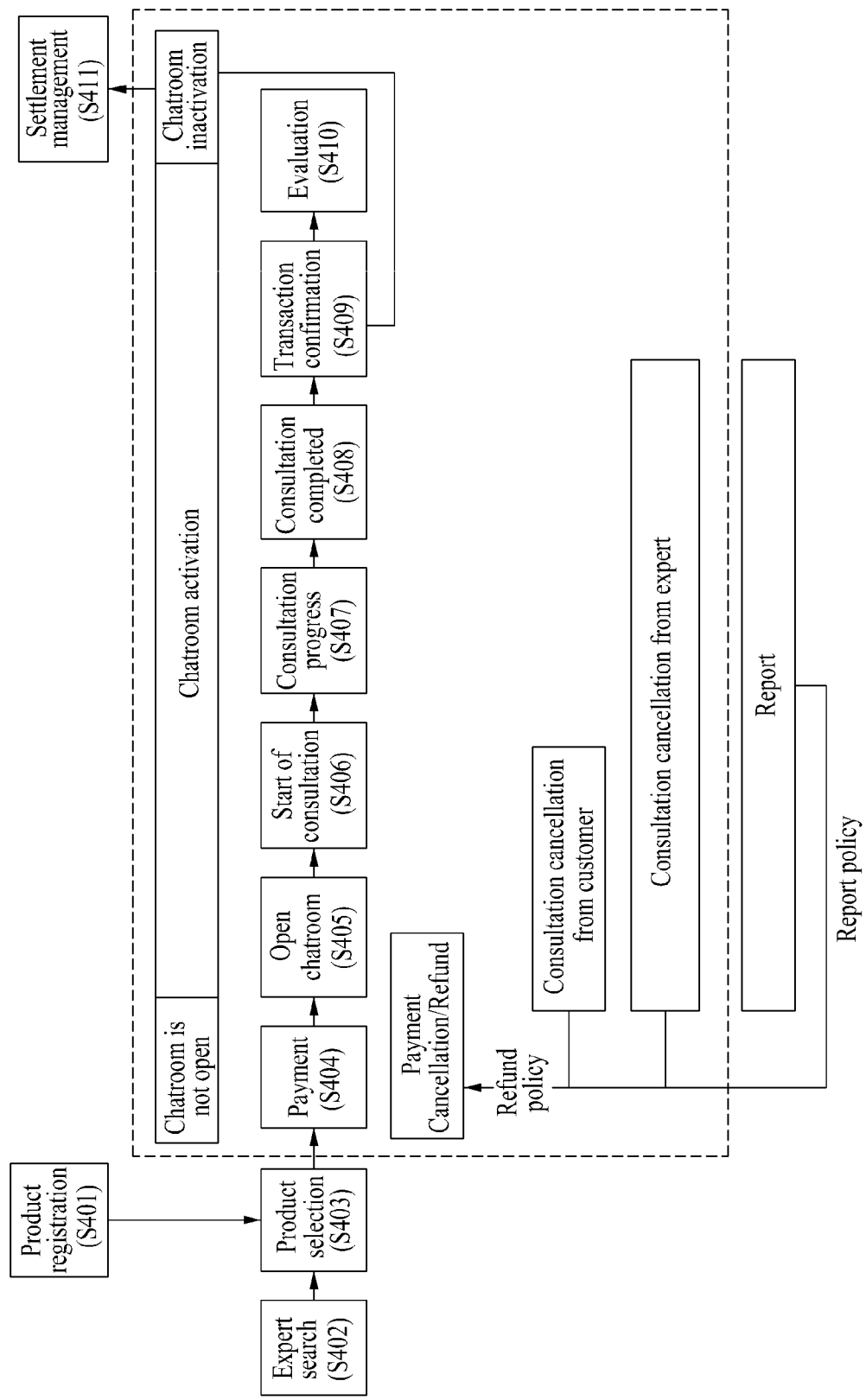
FIG. 4 is a flowchart illustrating an example of an expert consultation process according to an example embodiment.

FIG. 4 is a flowchart illustrating an example of an expert consultation process according to an example embodiment.

Referring to FIG. 4, in operation S401, the processor 220 may register a consultation product of a corresponding expert based on product information input from the expert.

The processor 220 provides a search function for a user to search for an expert of a desired topic in operation S402, and the processor 220 selects a consultation product specified by the user through a search in operation S403.

After proceeding with a payment of a product selected by the user in conjunction with a payment service in operation S404, the processor 220 opens a one-to-one chatroom between the user and the expert of the product for which the payment is completed in operation S405.

When the user accepts a consultation start request from the expert through the chatroom, the processor 220 starts the consultation in operation S406 and the consultation proceeds through a one-to-one conversation between the user and the expert in operation S407.

The processor 220 completes the consultation as the consultation progress time elapses or upon a request from the expert or the user in operation S408 and confirms a transaction of the user for the corresponding consultation product in response to completion of the consultation in operation S409.

Even after processing the payment or opening the chatroom, it is possible to cancel the consultation upon a request from the user before the start of the consultation. After the start of the consultation, it is possible to cancel the consultation upon the request from the expert. Also, it is possible to cancel the consultation with approval of the expert for a cancellation request from the user after the consultation starts.

For a consultation cancellation case, a full cancellation or a partial cancellation may be applied according to a refund policy. In addition to the consultation cancellation request from the expert or the user, a refund policy according to report or monitoring on a consultation quality may be applied.

The processor 220 may collect evaluation information on the consultation product for which the transaction is confirmed from the user that has consulted with the expert in operation S410 and may manage settlement details of the expert based on a confirmed transaction case in operation S411.

The processor 220 may provide a real-time online consultation with the expert through a private one-to-one conversation.

FIGS. 5 to 8 illustrate examples of an interface screen for a consultation product search according to an example embodiment.

Figure 5:
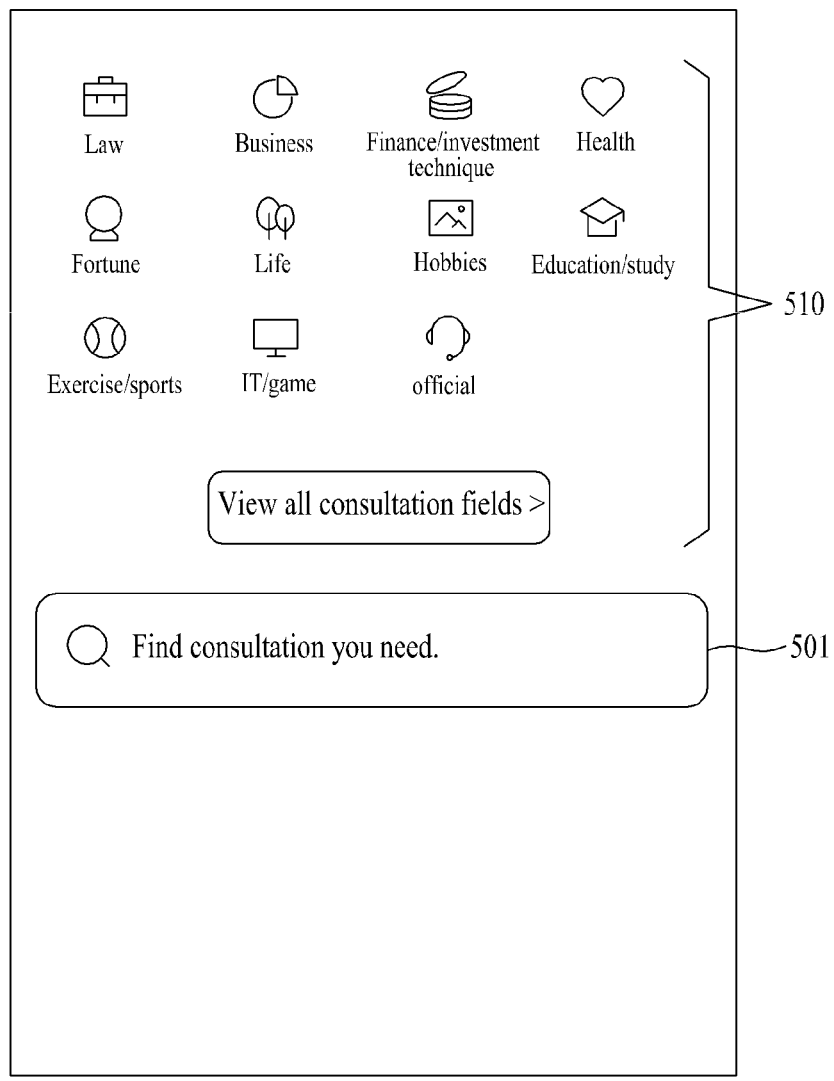
FIGS. 5 to 8 illustrate examples of an interface screen for a consultation product search according to an example embodiment.

FIG. 5 illustrates an example of a home screen 500 of an expert consultation service and the home screen 500 may include a consultation field list 510 available on a platform and a "search" menu 501 for searching for a consultation product using a search term.

Figure 6:
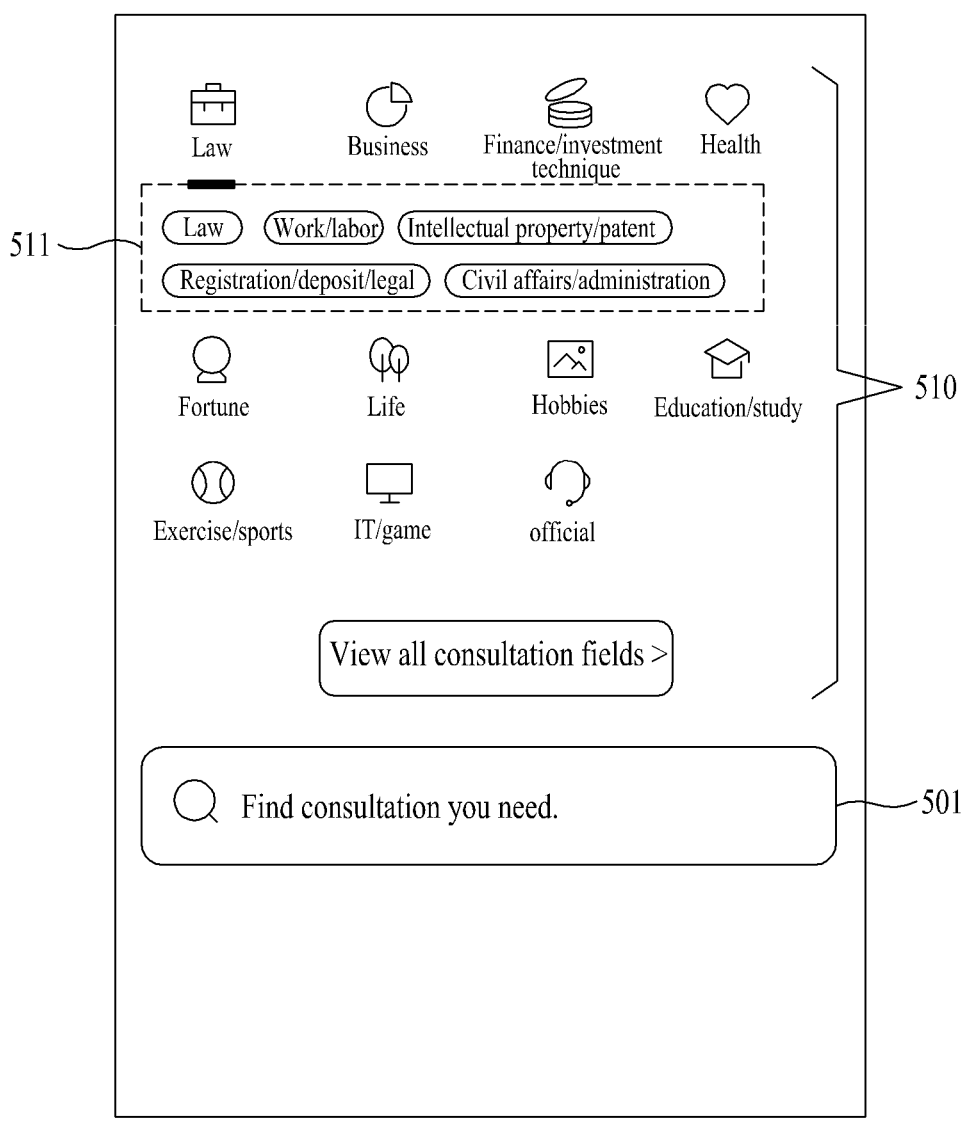

For example, the consultation field list 510 may include a large category list for consultation fields, such as law, business, finance/investment technique, health, fortune, life, hobbies, education/study, exercise/sports, IT/game, etc. Referring to FIG. 6, when selecting a specific consultation field from the consultation field list 510, the processor 220 may provide a sub-category list 511 for the corresponding consultation field. That is, the processor 220 may divide the consultation field into a plurality of depths and may provide the consultation field in a stepwise manner such that the user may more easily find a product of a desired topic.

Figure 7:
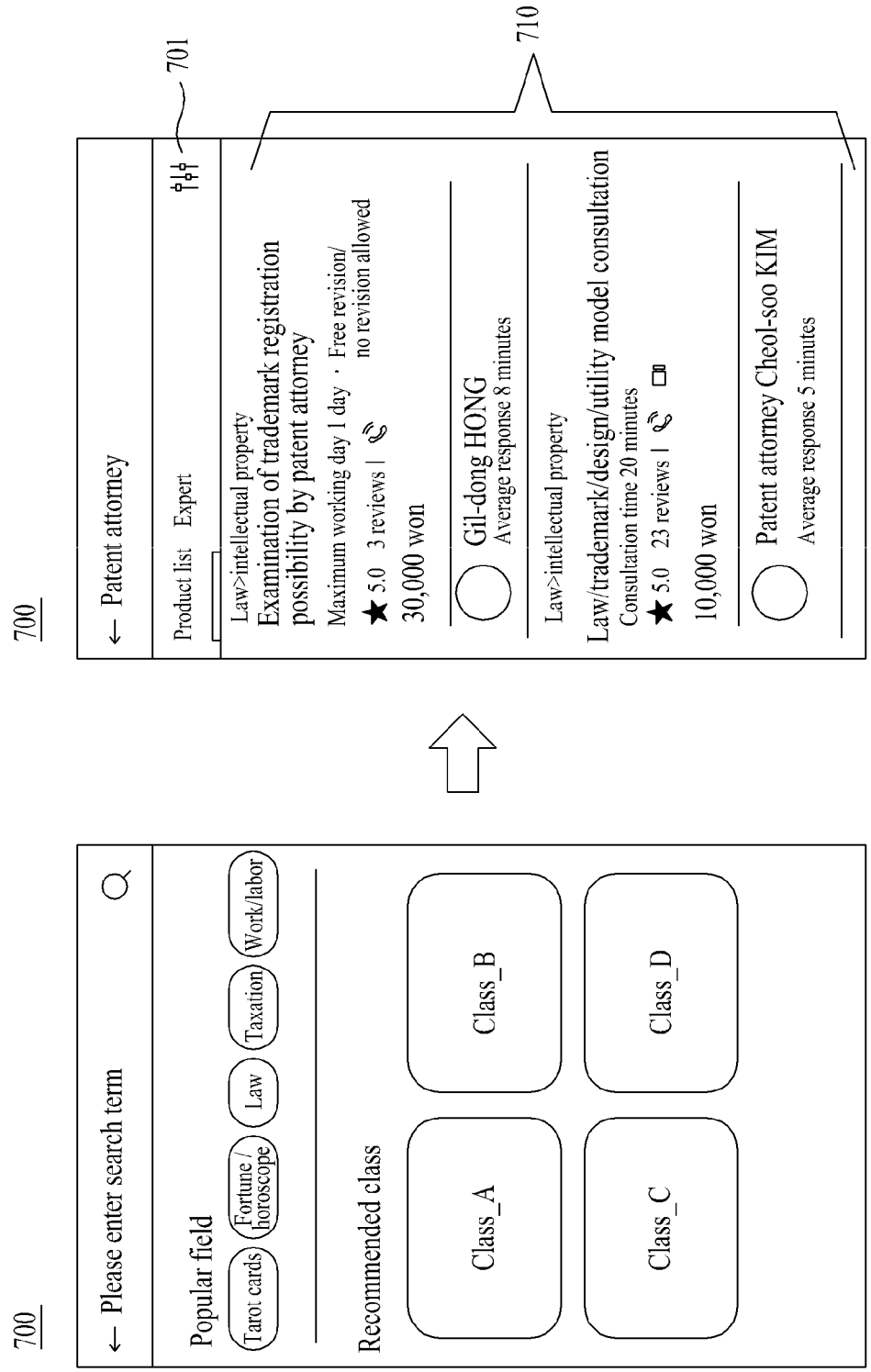

Referring to FIG. 7, when selecting the "search" menu 501 on the home screen 500, the processor 220 may provide a search screen 700 for searching for a consultation product. When a search term is input on the search screen 700, the processor 220 may provide search results 710 that match the corresponding search term. The search results 710 may include a product list that matches the search term and an expert list that matches the search term.

The search screen 700 may include a "filter" menu 701 for setting a search filter to adjust a search range when searching for a consultation product.

Figure 8:
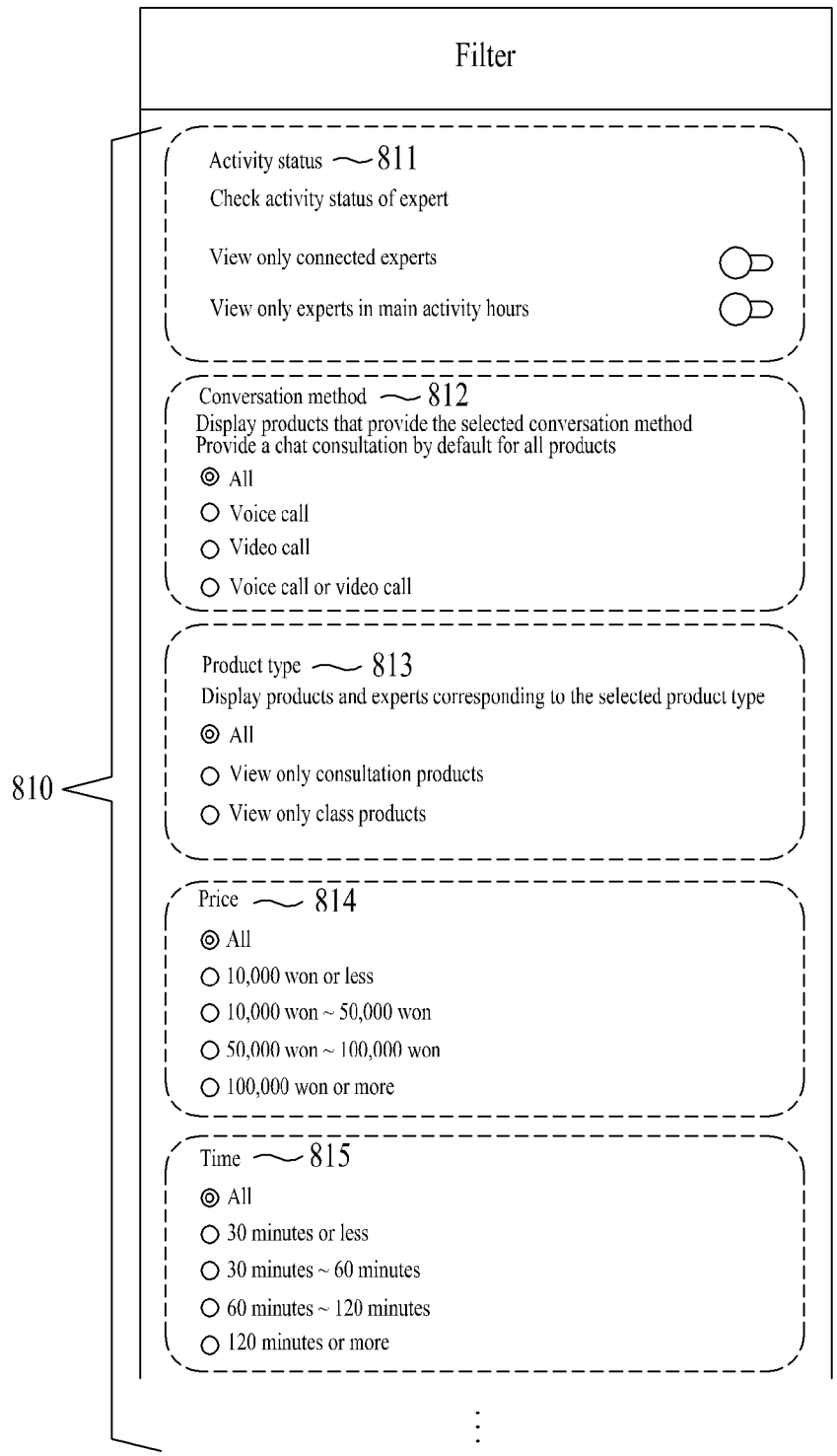

Referring to FIG. 8, when selecting the "filter" menu 701 on the search screen 700, the processor 220 may provide a filter setting screen 800 for setting the search filter. The filter setting screen 800 may include a search filter list 810 that includes an activity status 811, a conversation method 812, a product type 813, a consultation price 814, and a consultation progress time 815 as filter items specialized for consultation with an expert. At least one of option items required when registering a consultation product of an expert may be used as a search filter.

The activity status 811 may include, for example, a filter for searching for an expert currently connected and a filter for searching for an expert of which a main activity time is present as a search filter for searching for an expert in a user-desired activity status. The conversation method 812 may include, for example, a filter for searching for a product that allows a voice call, a filter for searching for a product that allows a video call, and a filter for searching for a product that allows both the voice call and the video call, as a search filter for searching for a product that provides a user-desired conversation method. The product type 813 may include, for example, a filter for searching for a general consultation product and a filter for searching for a class product, as a search filter for searching for a product and an expert corresponding to a user-desired product type. The consultation price 814 corresponds to a search filter for searching for a product within a price range desired by the user and the consultation progress time 815 corresponds to a search filter for searching for a product that allows a consultation in a time range desired by the user. The disclosure is not limited to the aforementioned filter items and a filter item may be expanded and thereby applied based on an option required for a product registration. For example, a search filter for searching for a class product that does not require a preparation and a search filter for searching for a product by lesson target (novice, beginner, intermediate, expert, anyone) may be additionally applied.

Therefore, the processor 220 may provide more accurate search results by filtering a consultation product of a topic desired by the user through a filter condition set by the user as well as a search term input from the user.

FIGS. 9 to 16 illustrate examples of an interface screen for describing an expert consultation process according to an example embodiment.

Figure 9:
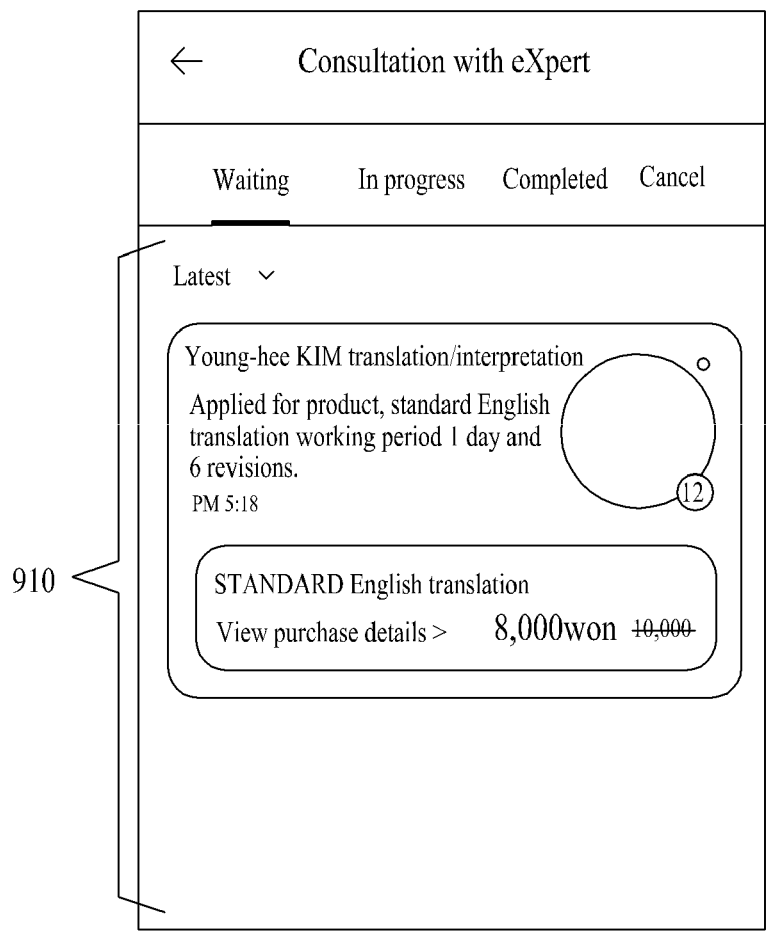
FIGS. 9 to 16 illustrate examples of an interface screen for describing an expert consultation process according to an example embodiment.

Referring to FIG. 9, the processor 220 may provide a consultation list screen 900 that includes a consultation list 910 of consultations purchased by a corresponding user in response to a user request. For example, the processor 220 may classify and thereby provide the consultation list 910 for each service status on the consultation list screen 900. For example, the processor 220 may classify the consultation list 910 into a list of waiting consultations, a list of consultations in progress, a list of completed consultations, and a list of cancelled consultations according to a service status. As another example, the processor 220 may classify and thereby provide the consultation list 910 for each payment status on the consultation list screen 900.

Figure 10:
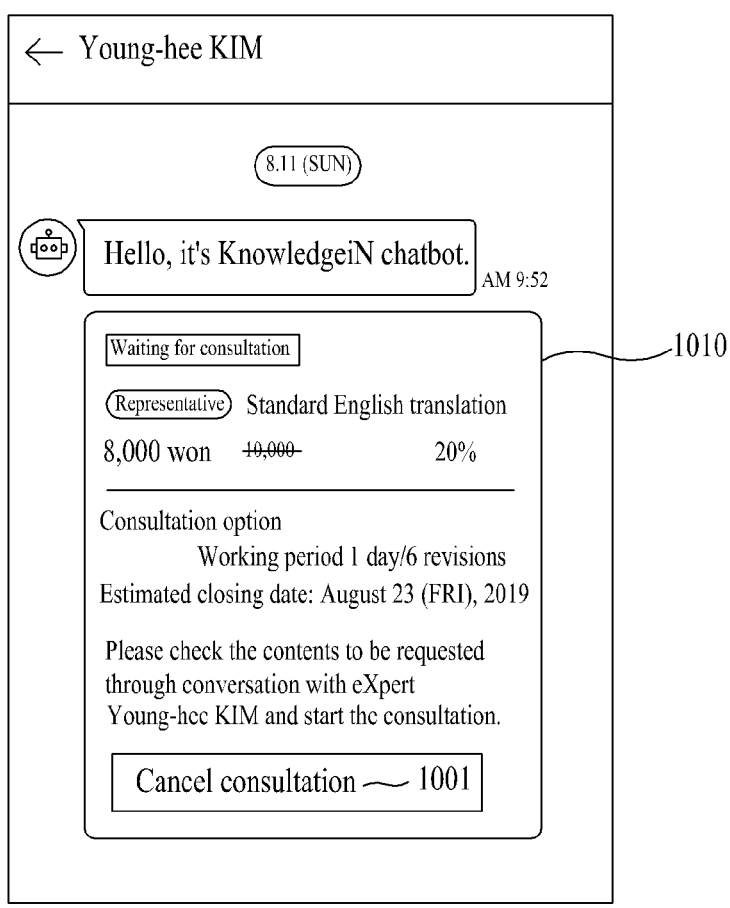

Referring to FIG. 10, when a user purchases a consultation product, the processor 220 opens and activates a chatroom 1000 for a one-to-one conversation between the user and an expert of the corresponding product and provides the activated chatroom 1000 on the electronic devices 110, 120, 130, 140 of the user and the expert. Also, in the case of selecting a consultation product of which a service status is waiting for consultation or consultation in progress on the consultation list screen 900, the user may move to the chatroom 1000.

The processor 220 may configure and provide guidance information related to the consultation product using a chatbot message. The chatbot message may be configured using a system message and also a title of a CompositeContent type, a description, an element list, and a button element. When the chatroom 1000 is activated according to a product purchase, the processor 220 provides a chatbot message that includes product information 1010 of a product purchased by the user through the chatroom 1000. In the case of a product of which a service status is waiting for consultation, a "cancel consultation" menu 1001 for cancelling a consultation of the corresponding product may be displayed in an active state. Using the "cancel consultation" menu 1001, the user may cancel the consultation of the product before starting the consultation.

Figure 11:
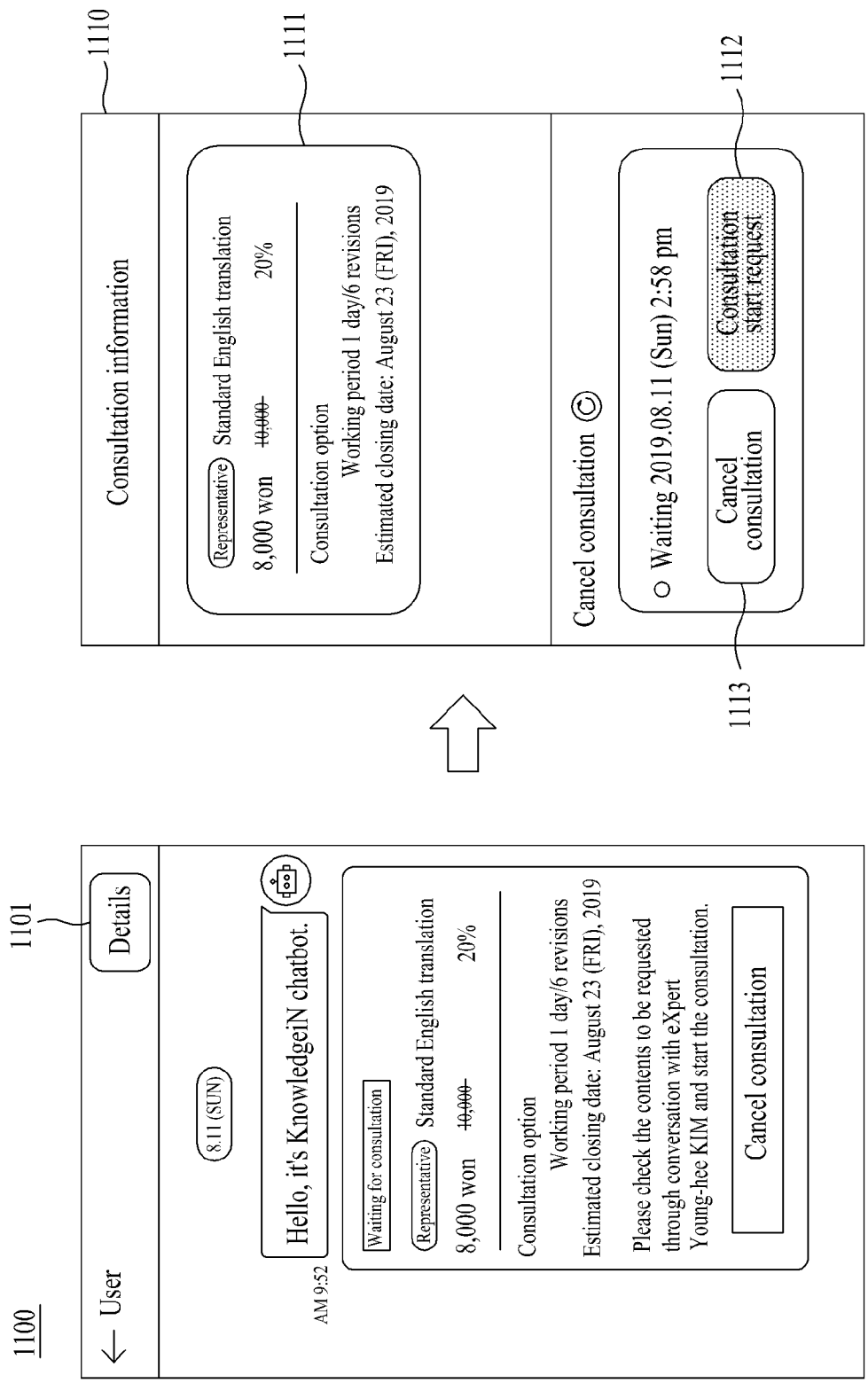
Figure 12:
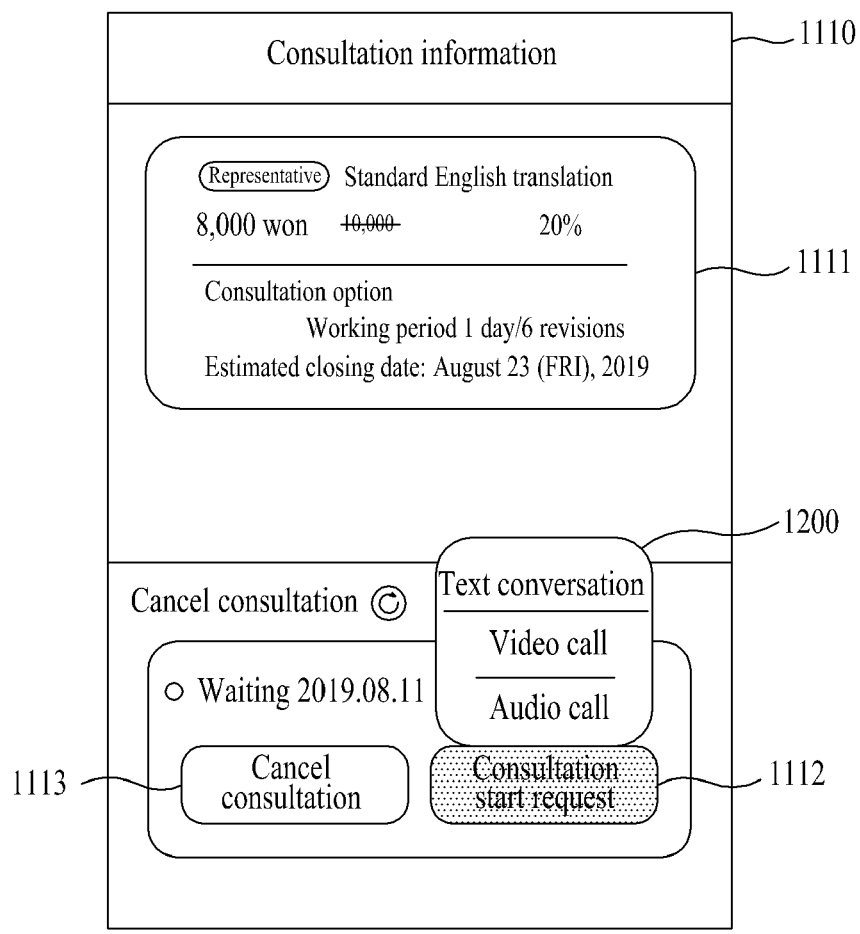

Referring to FIG. 11, a chatroom 1100 of an expert side may include a "details" menu 1101 for moving to a consultation detail page 1110. When the "details" menu 1101 is selected, the processor 220 may provide the consultation detail page 1110. Here, the consultation detail page 1110 may include product information 1111 of a product purchased by the user. In the case of a product of which consultation status is waiting for consultation, the consultation detail page 1110 may include a "consultation start request" menu 1112 for requesting start of the consultation and a "cancel consultation" menu 1113 for cancelling the consultation of the corresponding product. The expert may verify the product information 1111 of the product purchased by the user and may cancel the consultation of the corresponding product before starting the consultation using the "cancel consultation" menu 1113. For example, the consultation product of the expert may be classified into a time-based consultation product and a case-based consultation product. In the case of the case-based consultation product, a deadline needs to be set when making a consultation start request.

Depending on example embodiments, it is also possible to select a conversation method (a consultation method) when the expert requests the user for the start of a consultation. For example, referring to FIG. 12, when the expert selects the "consultation start request" menu 1112 on the consultation detail page 1110, the processor 220 provides a conversation method selection screen 1200 for selecting a conversation method through the chatroom 1000. The conversation method selection screen 1200 may include an interface for selecting one of conversation types supportable through a one-to-one conversation between the expert and the user, for example, a text conversation, a video call, and a voice call.

Figure 13:
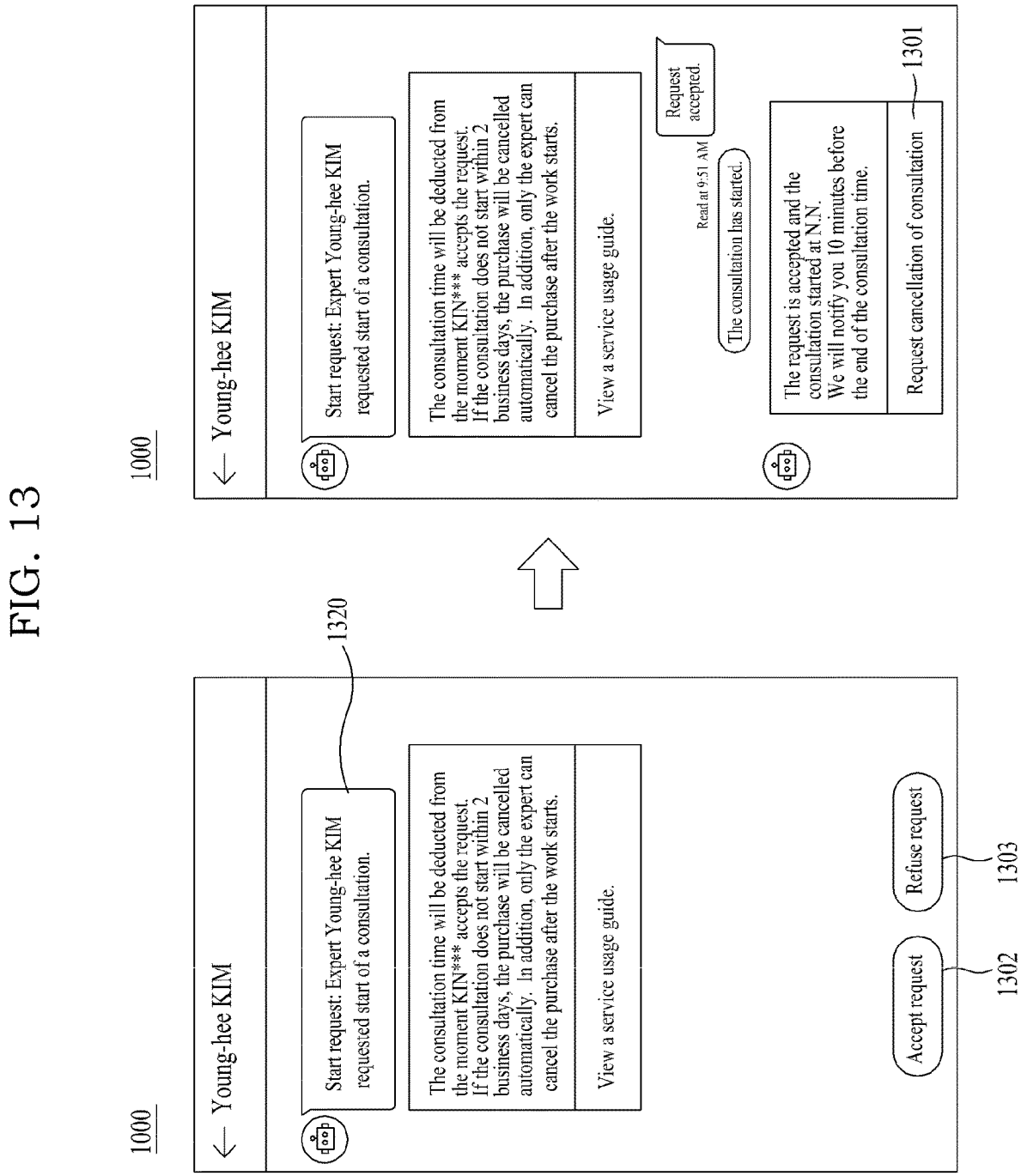

Referring to FIG. 13, when the expert selects the "consultation start request" menu 1112 on the consultation detail page 1110, the processor 220 provides a consultation start request from the expert using a chatbot message 1320 through the chatroom 1000. Here, an "accept request" menu 1302 for accepting the consultation start request from the expert and a "refuse request" menu 1303 for refusing the consultation start request may be displayed on the chatroom 1000. The user may accept or refuse the consultation start request from the expert using the "accept request" menu 1302 or the "refuse request" menu 1303.

When the user refuses the consultation start request from the expert, the expert may request again the start of the consultation. If the consultation does not start after a payment or the product is completed or after a predetermined period of time elapses after the consultation start request from the expert, the consultation of the corresponding product may be automatically cancelled.

When the user selects the "accept request" menu 1302 on the chatroom 1000 in response to the consultation start request from the expert, the processor 220 guides the start of the consultation through the chatbot message and supports a one-to-one conversation between the expert and the user. Here, the processor 220 may provide the one-to-one conversation through the chatroom 1000 using a conversation method selected at a point in time at which the expert requests the user for the start of the consultation. When the user accepts the start of the consultation in response to the consultation start request through a text conversation with the expert and the consultation starts accordingly, the chatroom 1000 of the user side and the chatroom 1100 of the expert side may send texts through a message input window and may also send each type of messages using a sticker, an image, a file, a voice, and a video. The chatroom 1100 of the expert side may provide an interface of selecting and sending a phrase from among registered phrases in a state in which frequently used phrases are registered in advance. When the user accepts the start of the consultation in response to the consultation start request through a video call or a voice call with the expert, the processor 220 may also provide a real-time video or voice call through the chatroom 1000.

In addition to providing the real-time video/voice call as the one-to-one conversation between the expert and the user, voice and video may be exchanged in a message format through the chatroom 1000. For example, in response to a voice message sent from the user, the expert may respond with a voice message or a video message and, in response to a video message sent from the user, the expert may respond with a video message or a voice message.

Although it is described that the expert selects a conversation method, it is provided as an example only. Depending on example embodiments, the user may directly select a conversation method at a point in time at which the user accepts start of a consultation. For example, when the user selects the "accept request" menu 1302 on the chatroom 1000, the processor 220 may provide an interface for selecting one of conversation types supportable through a one-to-one conversation between the expert and the user, for example, a text conversation, a video call, and a voice call, and may proceed with a consultation method selected by the user.

When the expert requests the user for start of a consultation or when the user accepts a consultation start request from the expert, the processor 220 may provide a function of selecting a conversation method and may also provide a conversation time reservation function capable of reserving a conversation start time (a consultation start time). For example, the processor 220 may deliver a consultation start request from the expert to the user or may deliver a consultation acceptance intent from the user to the expert at a time set through the conversation time reservation function. That is, when the conversation start time is set through the conversation time reservation function at a point in time at which the expert requests the user for the start of the consultation, the processor 220 may deliver the consultation start request to the user at the set time. When the conversation start time is set through the time reservation function at a point in time at which the user accepts the consultation start request from the expert, the processor 220 may deliver the consultation acceptance intent to the expert at the set time. As another example, the time set through the conversation time reservation function may be included in a consultation start request from the expert and then delivered to the user, or may be included in a consultation acceptance intent from the user and then delivered to the expert. When the expert sets a consultation start time, the consultation start time may be included in the consultation start request and then immediately delivered to the user. When the user accepts a consultation start time set by the expert, a one-to-one conversation reservation may be set at the corresponding time. Meanwhile, when the user sets the consultation start time, the consultation start time may be included in the consultation acceptance intent and immediately delivered to the expert. When the expert accepts a consultation start time set by the user, a one-to-one conversation reservation may be set at the corresponding time.

After the consultation starts, the user may not directly cancel the consultation and may request the expert to cancel the consultation. A "request cancellation of consultation" menu 1301 for requesting cancellation of the consultation may be displayed on the chatroom 1000 of the user side through a chatbot message that guides the start of the consultation.

Figure 14:
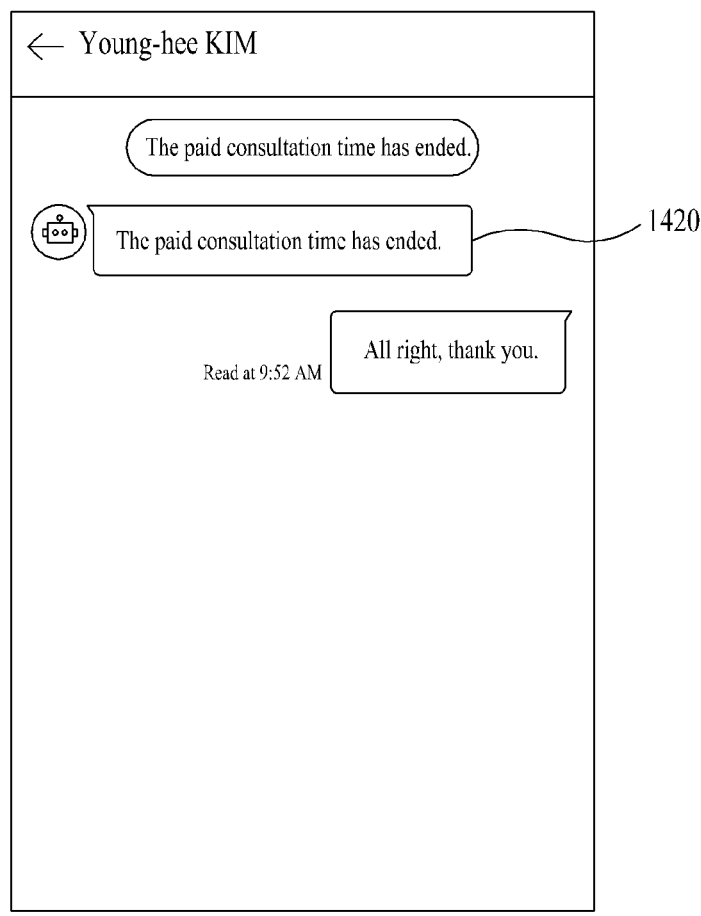
Figure 15:
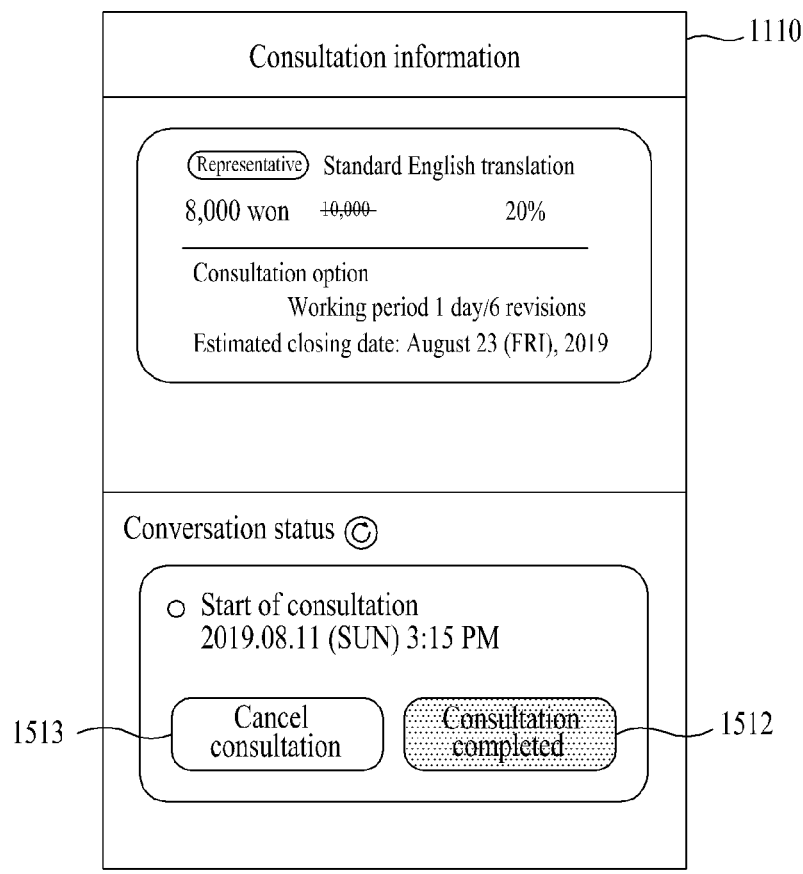

Referring to FIG. 14, when a paid consultation time of a product purchased by the user ends, the processor 220 may send a chatbot message 1420 that guides end of a consultation through the chatroom 1000. In the case of a case-based consultation product, arrival of a set deadline may be guided using the chatbot message. In the case of a time-based consultation product, end of the paid consultation time may be guided using the chatbot message. Referring to FIG. 15, a "consultation completed" menu 1512 for the expert to deliver a consultation completion status to the user and a "cancel consultation" menu 1513 for cancelling a consultation may be included in the consultation detail page 1110 of the product for which consultation has started. When the paid consultation time elapses, the expert may directly process the consultation as being completed using the "consultation completed" menu 1512. Alternatively, in response to a request from the expert or the user after the consultation starts, the expert may cancel the consultation using the "cancel consultation" menu 1513.

Figure 16:
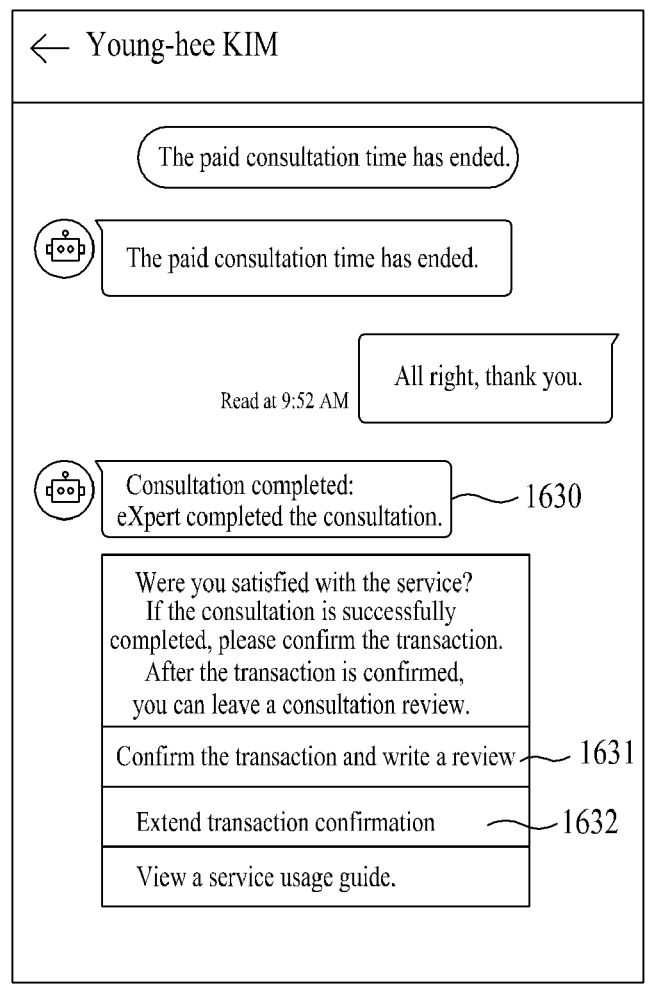

Referring to FIG. 16, when the expert selects the "consultation completed" menu 1512 on the consultation detail page 1110, the processor 220 provides a consultation completion status of the expert using a chatbot message 1630 through the chatroom 1000. Here, a "confirm the transaction and write a review" menu 1631 for requesting a transaction confirmation for a product for which consultation is completed and an "extend transaction confirmation" menu 1632 for extending a transaction confirmation for a product for which consultation is completed may be displayed in a form of an activated quick button in the chatroom 1000. The user may confirm the transaction or may extend the transaction confirmation for the product for which consultation with the expert is completed. The processor 220 may request and collect evaluation information, such as a review for a product of which transaction is confirmed from the user through the chatroom 1000.

Therefore, the processor 220 may provide a new type of an expert consultation service through connection to a chat service rather than an open bulletin.

According to some example embodiments, it is possible to provide a real-time online consultation with an expert without restrictions on time and occasion through a private one-to-one conversation and to provide a consultation with an expert through a chat in which a chatbot that overall guides progress of a consultation participates. According to some example embodiments, a user may search for a consultation on a topic desired by the user using a filter item specialized for a consultation with an expert and it is possible to provide a paid consultation with an expert in conjunction with a simple payment service.

The apparatuses described herein may be implemented using hardware components and/or a combination of hardware components and software components. For example, the apparatuses and the components described herein may be implemented using one or more general-purpose or special purpose computers or processing devices, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A chatroom providing method performed by a computer apparatus having at least one processor configured to execute computer-readable instructions included in a memory, the method comprising:

registering a plurality of consultation products in a plurality of consultation fields input by a plurality of corresponding experts;

searching for a consultation product corresponding to a user request from the registered plurality of consultation products;

processing a payment for the consultation product selected from search results; and providing a one-to-one conversation by activating a chatroom between a user and an expert having registered the consultation product for which the payment is completed, wherein the chatroom includes a chatbot message for providing product information about the consultation product for which the payment is completed and guidance information related to the use of the consultation products including a first menu for enabling the user to cancel the consultation product prior to a start of a consultation with the expert, a second menu for enabling the expert to cancel the consultation product, a third menu for enabling the expert to start the consultation with the user, and a conversation method selection screen, displayed responsive to a selection of the third menu by the expert, for enabling the expert to select a conversation method.

2. The chatroom providing method of claim 1, wherein the one-to-one conversation is provided using a conversation method selected by the user from among a text conversation, a voice call, and a video call through the chatroom.

3. The chatroom providing method of claim 1, wherein the providing of the one-to-one conversation comprises reserving the chatroom at a time set by the expert or the user.

4. The chatroom providing method of claim 1, wherein the payment for the consultation product is processed on a regular payment cycle set by the user or a regular payment cycle preset for the consultation product according to settings of the user.

5. The chatroom providing method of claim 1, wherein the providing of the one-to-one conversation comprises providing a menu for the user to accept the start of the consultation and a menu for refusing the start of the consultation.

6. The chatroom providing method of claim 5, wherein the providing of the one-to-one conversation comprises providing a consultation start guidance when the user accepts the start of the consultation and then providing the one-to-one conversation.

7. The chatroom providing method of claim 5, wherein the providing of the one-to-one conversation comprises providing a consultation completion status received from the expert using the chatbot message and providing a menu for requesting a transaction confirmation for a product for which the consultation is completed.

8. The chatroom providing method of claim 1, further comprising:
cancelling a consultation of a corresponding product with acceptance of the expert when a consultation cancellation request is received from the user for the consultation product for which the payment is completed after starting the consultation.

9. A chatroom providing method performed by a computer apparatus having at least one processor configured to execute computer-readable instructions included in a memory, the method comprising:
registering a plurality of consultation products in a plurality of consultation fields input by a plurality of corresponding experts;
searching for a consultation product corresponding to a user request from the registered plurality of consultation products;
processing a payment for the consultation product selected from search results; and
providing a one-to-one conversation by opening a chatroom between a user and an expert having registered the consultation product for which the payment is completed,
wherein the searching for the consultation product includes adjusting a search range of the consultation product using at least one search filter set by the user, and
wherein the chatroom includes a chatbot message for providing product information about the consultation product for which the payment is completed and guidance information related to the use of the consultation product including a first menu for enabling the user to cancel the consultation product prior to a start of a consultation with the expert, a second menu for enabling the expert to cancel the consultation product, a third menu for enabling the expert to start the consultation with the user, and a conversation method selection screen, displayed responsive to a selection of the third menu by the expert, for enabling the expert to select a conversation method.

10. The chatroom providing method of claim 9, wherein an activity status of the expert is used as a filter condition in searching for the consultation product.

11. The chatroom providing method of claim 9, wherein at least one of a consultation method of the expert, a product type, a consultation price, and a consultation progress time is used as a filter condition.

12. A non-transitory computer readable recording medium storing a computer program that, when executed by a computer processor, performs the chatroom providing method of claim 1.

13. A computer apparatus comprising:
at least one processor configured to execute computer-readable instructions included in a memory,
wherein the at least one processor is configured to:
register a plurality of consultation products in a plurality of consultation fields input by a plurality of corresponding experts,
search for a consultation product corresponding to a user request from the registered plurality of consultation products,
process a payment for the consultation product selected from search results,
provide a one-to-one conversation by activating a chatroom between a user and an expert having registered the consultation product for which the payment is completed, and
provide chatbot message for providing product information about the consultation product for which the payment is completed and guidance information related to the use of the consultation product including a first menu for enabling the user to cancel the consultation product prior to a start of a consultation with the expert, a second menu for enabling the expert to cancel the consultation product, a third menu for enabling the expert to start the consultation with the user, and a conversation method selection screen, displayed responsive to a selection of the third menu by the expert, for enabling the expert to select a conversation method.

14. The computer apparatus of claim 13, wherein the one-to-one conversation is provided using a conversation method selected by the user from among a text conversation, a voice call, and a video call through the chatroom.

15. The computer apparatus of claim 13, wherein the at least one processor is configured to:
provide a menu for the user to accept the start of the consultation and a menu for refusing the start of the consultation, and
provide a consultation start guidance when the user accepts the start of the consultation and then provide the one-to-one conversation.

16. The computer apparatus of claim 13, wherein the at least one processor is configured to adjust a search range of the consultation product using at least one search filter set by the user.

17. The computer apparatus of claim 13, wherein the at least one processor is configured to search for the consultation product using at least one of a consultation method of the expert, a product type, a consultation price, and a consultation progress time as a filter condition.

* * * * *